(12) United States Patent
Jeong et al.

(10) Patent No.: US 7,539,192 B2
(45) Date of Patent: May 26, 2009

(54) GATEWAY AND CONTROL METHOD THEREOF

(75) Inventors: Jong-cheol Jeong, Suwon (KR); Hak-yong Kim, Suwon (KR); Jong-oh Im, Seoul (KR); Hyoun-sun Lee, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 694 days.

(21) Appl. No.: 10/812,105

(22) Filed: Mar. 30, 2004

(65) Prior Publication Data

US 2005/0013321 A1 Jan. 20, 2005

(30) Foreign Application Priority Data

Jul. 18, 2003 (KR) .................. 10-2003-0049310

(51) Int. Cl.
*H04L 12/28* (2006.01)
(52) U.S. Cl. ...................... 370/392; 370/401
(58) Field of Classification Search ............ None
See application file for complete search history.

(56) References Cited

U.S. PATENT DOCUMENTS

| | | | |
|---|---|---|---|
| 5,251,205 A | 10/1993 | Callon et al. | |
| 5,790,548 A | 8/1998 | Sistanizadeh et al. | |
| 6,314,531 B1* | 11/2001 | Kram | 714/38 |
| 6,434,627 B1* | 8/2002 | Millet et al. | 709/245 |
| 6,552,997 B1* | 4/2003 | Inoue et al. | 370/217 |
| 6,633,565 B1* | 10/2003 | Bronstein et al. | 370/392 |
| 6,870,852 B1* | 3/2005 | Lawitzke | 370/401 |
| 7,093,030 B1* | 8/2006 | Henry et al. | 709/250 |
| 2002/0019933 A1* | 2/2002 | Friedman et al. | 713/160 |
| 2002/0052972 A1* | 5/2002 | Yim | 709/245 |
| 2002/0055991 A1* | 5/2002 | Arrouye et al. | 709/220 |
| 2003/0016624 A1* | 1/2003 | Bare | 370/217 |
| 2003/0140124 A1* | 7/2003 | Burns | 709/220 |

(Continued)

FOREIGN PATENT DOCUMENTS

JP 5-122225 5/1993

(Continued)

OTHER PUBLICATIONS

Korean Office Action for related application.

*Primary Examiner*—Andrew Lee
(74) *Attorney, Agent, or Firm*—Staas & Halsey LLP

(57) ABSTRACT

A gateway comprising a first port connected to a network and a second port connected to a target node and being employed for a data stream between the network and applications of the target node, the gateway further comprising: a storage unit to store an IP address of the target node; an MAC address converter to set an MAC address of the target node as an MAC address of the first port; a controller to set an IP address of the second port based on an IP address of the target node, and to read the MAC address of the target node through the second port and set the IP address of the target node as an IP address of the first port; and a router to set a transmission route and transmit data to the IP address of the target node without a local loop back process, in response to the IP address of the target node and the IP address of the first port being the same.

8 Claims, 9 Drawing Sheets

U.S. PATENT DOCUMENTS

| | | | |
|---|---|---|---|
| 2003/0142684 A1* | 7/2003 | Miyachi | 370/401 |
| 2003/0229779 A1* | 12/2003 | Morais et al. | 713/153 |
| 2004/0010653 A1* | 1/2004 | Grundy et al. | 710/315 |
| 2004/0052216 A1* | 3/2004 | Roh | 370/252 |
| 2004/0057425 A1* | 3/2004 | Brouwer et al. | 370/352 |
| 2004/0095943 A1* | 5/2004 | Korotin | 370/401 |
| 2004/0107382 A1* | 6/2004 | Doverspike et al. | 714/4 |
| 2004/0215756 A1* | 10/2004 | VanAntwerp et al. | 709/223 |
| 2004/0249975 A1* | 12/2004 | Tuck et al. | 709/245 |
| 2005/0232254 A1* | 10/2005 | Korner | 370/360 |

FOREIGN PATENT DOCUMENTS

| | | |
|---|---|---|
| KR | 2001-87322 | 9/2001 |
| KR | 2002-79979 | 10/2002 |
| KR | 10-2005-0009914 | 1/2005 |
| WO | WO 02/076062 | 9/2002 |

* cited by examiner

GATEWAY AND CONTROL METHOD THEREOF

CROSS-REFERENCE TO RELATED APPLICATIONS

This application claims the benefit of Korean Patent Application No. 2003-49310, filed on Jul. 18, 2003, in the Korean Intellectual Property Office, the disclosure of which is incorporated herein by reference.

BACKGROUND OF THE INVENTION

1. Field of the Invention

The present invention relates to a gateway and a control method thereof, and, more particularly, to a gateway that is operated by being linked to an IP address of a target node connected to a network and intercepts and processes a data stream between the network and the target node, thereby transmitting the data stream to the destination, and a control method thereof.

2. Description of the Related Art

To intercept data sent/received to/from a target node connected to a network, an intermediary, or a repeater, physically cutting a connection between the network and the target node should be provided to draw a data stream of a specific port sent/received to/from the target node. Then, the drawn data stream is processed and inserted in the specific port and transmitted to the destination.

The intermediary should comprise at least two connecting ports, each having a different address from one another, to physically cut the connection between the network and the target node and intermediate the data stream again. Further, the addresses of the connecting ports connected to the network should be set up as the IP address of the target node, so as to be recognized as the target node.

Here, if the IP addresses of the connecting ports connected to the network and the IP address of the target node are the same, the data stream is not transmitted to the outside, and comes back to the inside of the intermediate by a local loop back, because a destination address of the data stream is the same as an IP address of the intermediary itself. Therefore, a new IP address of the target node should be set up again, so that the IP addresses of the connecting ports connected to the network and the IP address of the target node are not the same. Further, the IP address of the target node should return to the original IP address when the intermediary is eliminated, thereby causing a loss of time and manpower.

SUMMARY OF THE INVENTION

Accordingly, it is an aspect of the present invention to provide a gateway that is linked to an IP address of a target address connected to a network, and intercepts and processes a data stream between the network and the target node, thereby transmitting the data stream to the destination, and a control method thereof.

Additional aspects and/or advantages of the invention will be set forth in part in the description which follows and, in part, will be obvious from the description, or may be learned by practice of the invention.

The foregoing and/or other aspects of the present invention are achieved by providing a gateway comprising a first port connected to a network and a second port connected to a target node and being employed for a data stream between the network and applications of the target node, the gateway further comprising: a storage unit to store an IP address of the target node; an MAC address converter to set an MAC address of the target node as an MAC address of the first port; a controller to set an IP address of the second port based on an IP address of the target node, and to read the MAC address of the target node through the second port and set the IP address of the target node as an IP address of the first port; and a router to set a transmission route and transmit data to the IP address of the target node without a local loop back process, in response to the IP address of the target node and the IP address of the first port being the same.

According to an aspect of the invention, the gateway may further comprise: a data processor to intercept the data stream, and then process the data stream or make and transmit a new data stream; a filter information table to store information about process port numbers used by the data stream required to be processed in the data processor; and a filter transmitting only the data stream required to be processed to the data processor, based on the information stored in the filter information table.

The foregoing and/or other aspects of the present invention may also be achieved by providing a method of a control of a gateway comprising a first port connected to a network and a second port connected to a target node and being employed for a data stream between the network and applications of the target node, the control method comprising: storing an IP address of the target node; setting an IP address of the second port based on the IP address of the target node; and setting the IP address of the target node as an IP address of the first port.

According to an aspect of the invention, the control method may further comprise: storing information about process port numbers used by the data stream required to be processed; intercepting the data stream transmitted based on the information; processing the data; and transmitting the processed data to a destination to which the data should be transmitted.

According to an aspect of the invention, the control method may further comprise: making a new data stream; and transmitting the newly made data stream to a destination to which the data should be transmitted.

BRIEF DESCRIPTION OF THE DRAWINGS

These and/or other aspects and advantages of the present invention will become apparent and more readily appreciated from the following description of the embodiments, taken in conjunction with the accompanying drawings of which.

DETAILED DESCRIPTION OF THE PREFERRED EMBODIMENTS

Figure 1:
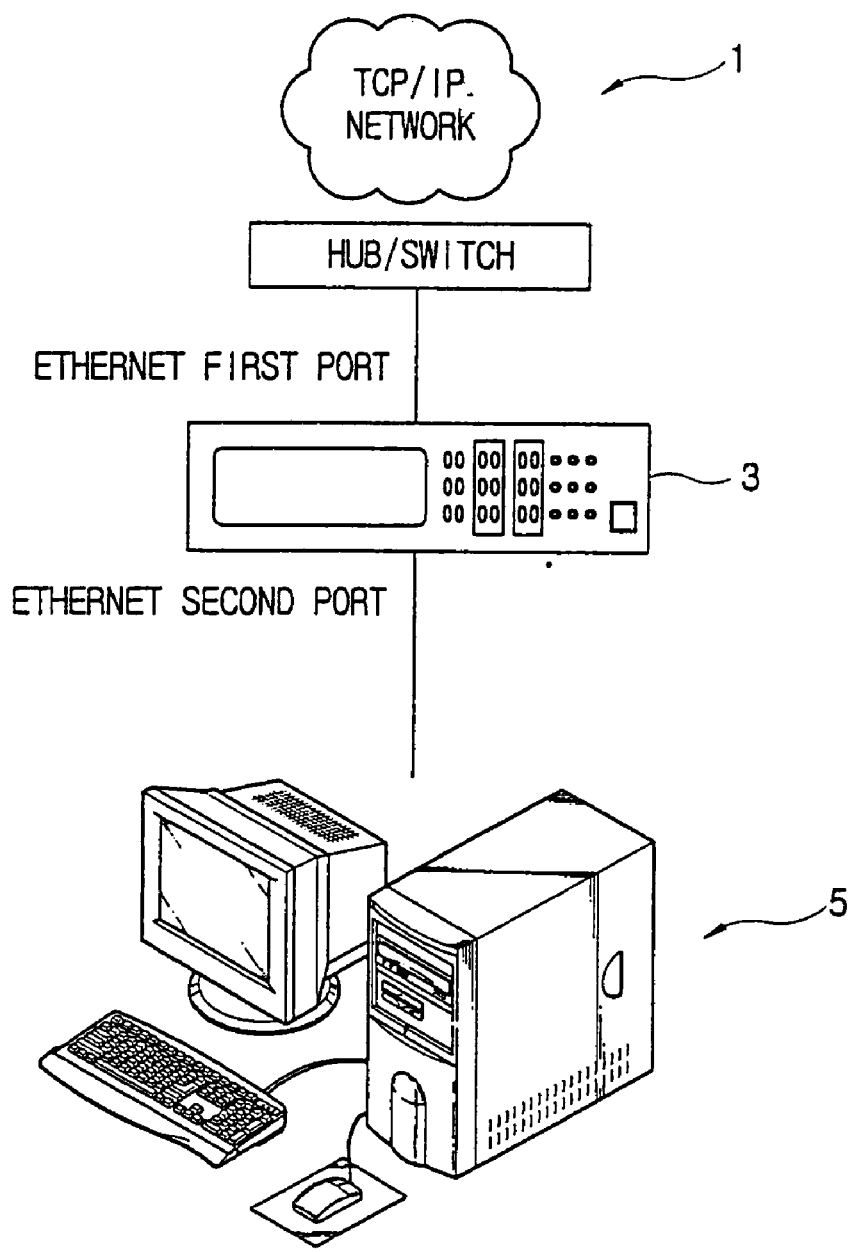
FIG. 1 is an interface with an external system according to an embodiment of the present invention.

Reference will now be made in detail to the embodiments of the present invention, examples of which are illustrated in the accompanying drawings, wherein like reference numerals refer to like elements throughout. The embodiments are described below to explain the present invention by referring to the figures.

As shown in FIG. 1, a gateway 3 according to an embodiment of the present invention contacts with an external system. A TCP/IP(Transmission control protocol/Internet protocol) network 1 is an internet comprising a plurality of hosts and network segments. A target node 5 is a node desired to be used among nodes connected to the TCP/IP network 1.

The gateway 3 is installed between the TCP/IP network 1 and the target node 5 desired to be used.

Figure 2:
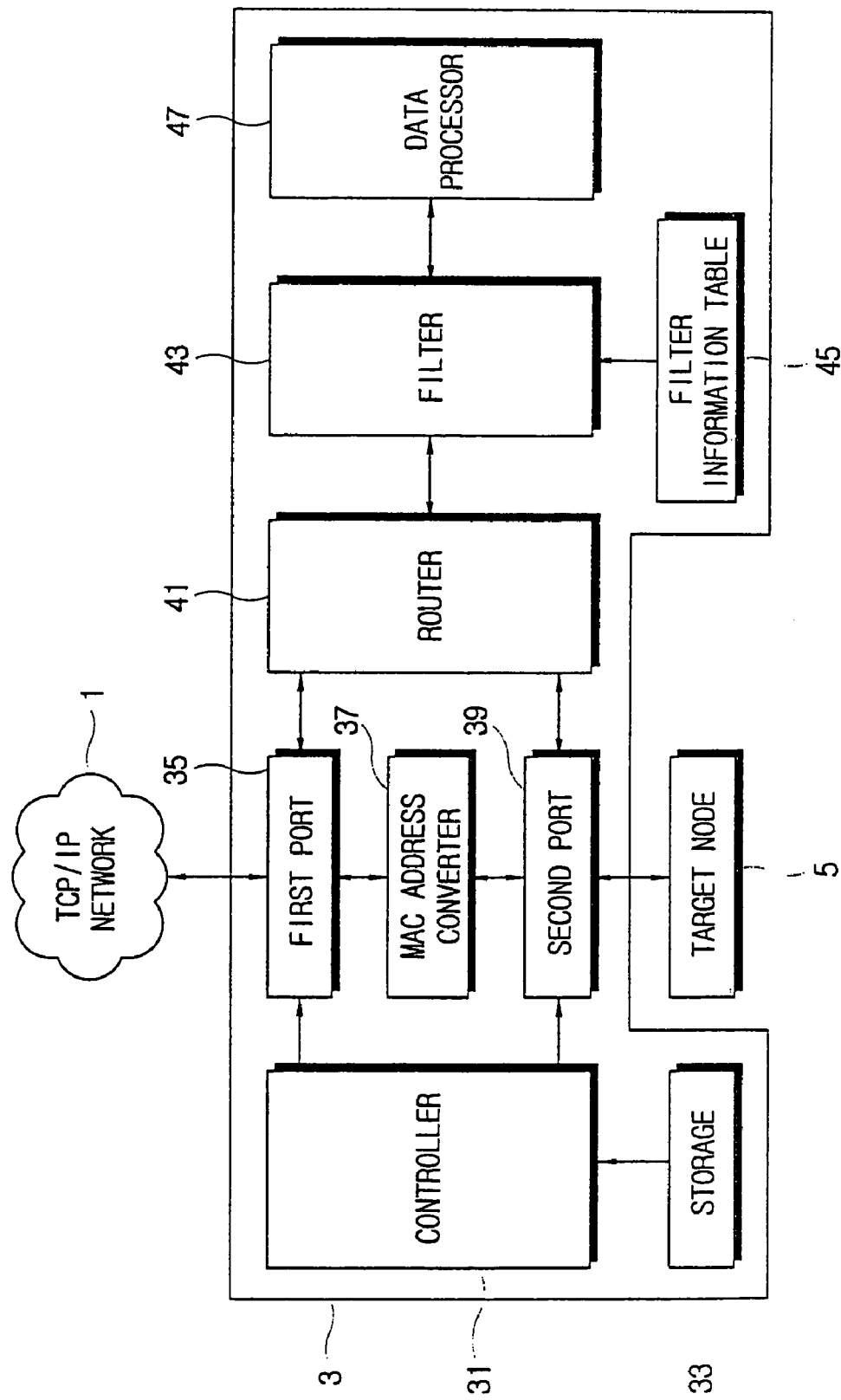
FIG. 2 is a block diagram according to an embodiment of the present invention.
Figure 3:
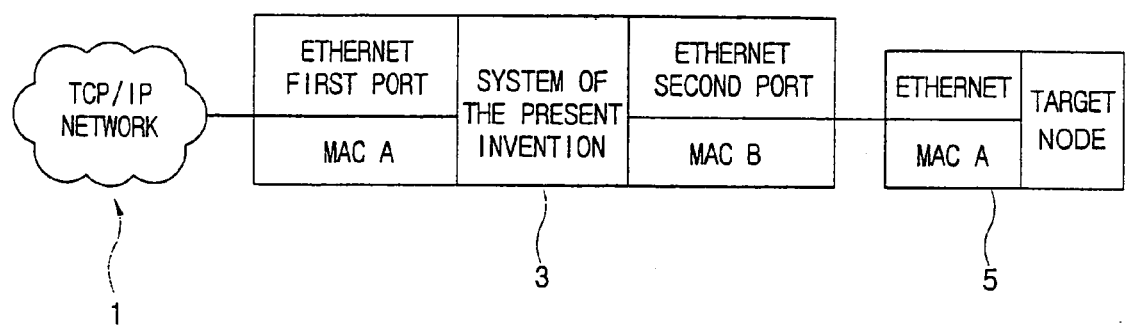
FIG. 3 shows how MAC addresses of the system of FIG. 2 and a target node are the same.

As shown in FIGS. 2 and 3, the gateway 3 comprises a storage 33, a controller 31, an MAC (media access control) address converter 37, a router 41, a filter 43, a filter information table 45, a data processor 47, a first port 35 connected to the TCP/IP network 1 through a switch or a hub, and a second port 39 directly connected to the target node 5 through a LAN(local area network) cable or the like.

In the storage 33, an IP(internet protocol) address of the target node 5 is previously recorded, and a flash memory, used as a nonvolatile memory, is generally used therefore.

The controller 31 reads the IP address of the target node 5, stored in the storage 33, when a system of the gateway 3 is initialized, and then sets up an IP address of the second port 39, based on the IP address of the target node 5. For example, the IP address of the second port 39 may be set up as a number of the IP address of the target node 5 plus 1, i.e., if the IP address of the target node is 192.168.3.12, the IP address of the second port 39 is set up as 192.168.3.13.

Then, the controller 31 reads an MAC address of the target node 5 through the second port 39. An ARP(address resolution protocol) is used for this. The ARP is a protocol to match a physical address to a network address, and used to search for a physical address of a specific host, if a network address thereof is known. A subnet to which the specific host belongs can be found through the IP address, but the host itself cannot be found therethrough, so that an MAC address is required to search for the host itself on the subnet. Here, the ARP is used to search for the MAC address, if the IP address of the specific host in known.

In the MAC address converter 37, an MAC address of the target node 5 read (by requesting the ARP to the target node 5) through the second port 39 is set up as an MAC address of the first port 35.

The router 41 sets up a transmission route and transmits the data through the route. Here, the router 41 serves to transmit the data to the IP address of the target node 5 without a local loop back process, if the IP address of the target node 5, to which the data is transmitted, is the same as the IP address of the first port 35. The local loop back is used when the same processes communicate with each other within a system. That is, if the local loop back is used, a communication packet is not transmitted to an external system, and comes back into the system, when the system communicates with the external system having the same IP address as that of the first port 35, through the second port 39. In the gateway 3 according to an embodiment of the present invention, the local loop back is not used.

The data processor 47 intercepts a data stream between the network 1 and applications of the target node 5, thereby processing the data stream or making and transmitting a new data stream.

For example, if a third node needs to use data between a specific node of the network 1 and the target node 5, the data processor 47 intercepts and processes the data, without touching each setting-up of the specific node of the network 1 and the target node 5. If a communication between the specific node of the network 1 and the target node 5 is changed into a communication between the specific node of the network 1 and the third node, a communication mode of the target node 5 is different from a communication mode of the third node, so that the data processor 47 intercepts data transmitted corresponding to the target node 5 and processes the intercepted data to correspond to the third node. Further, if the third node, as a substitute for the specific node of the network 1, needs to transmit a command to the target node 5, the data processor 47 makes new data and transmits the new data to the target node 5.

Information about port numbers used by a data stream required to be processed in the data processor 47 is stored in the filter information table 45.

The filter 43 transmits only the data stream required to be processed to the data processor 47, based on the information stored in the filter information table 45.

Figure 4:
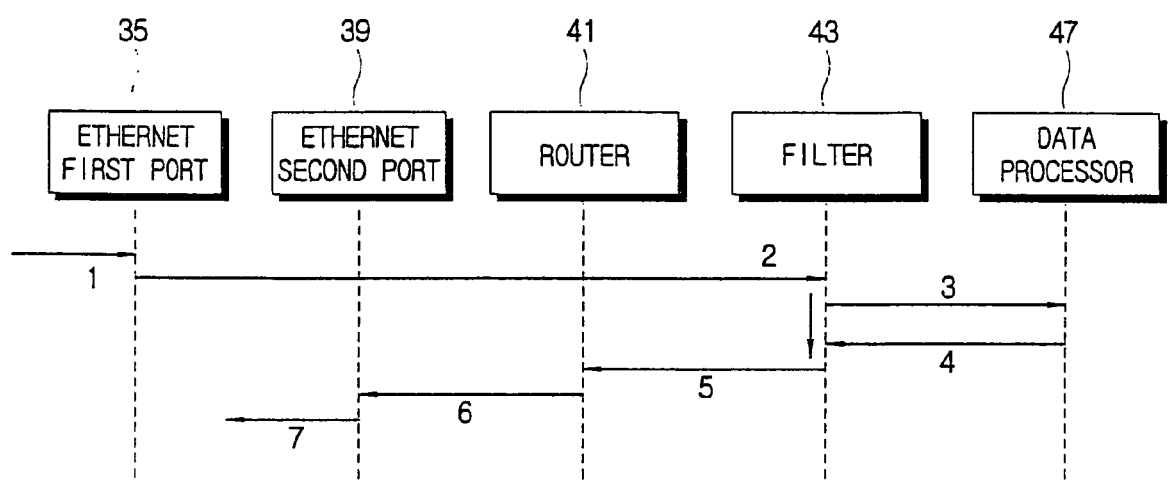
FIG. 4 shows a stream received from a TCP/IP network and transmitted to the target node.

As shown in FIG. 4, a data stream transmitted from the network 1 to the target node 5 through the first port 35 is first transmitted to the data processor 47 through the filter 43, if the data stream is required to be processed in the data processor 47. Then, the data is processed by the data processor 47 and transmitted to the second port 39 through the router 41, and then to the target node 5 through the second port 39.

If the data stream is not required to be processed in the data processor 47, the data stream is not transmitted to the data processor 47, due to the filter 43, but is transmitted to the second port 30 through the router 41.

Figure 5:
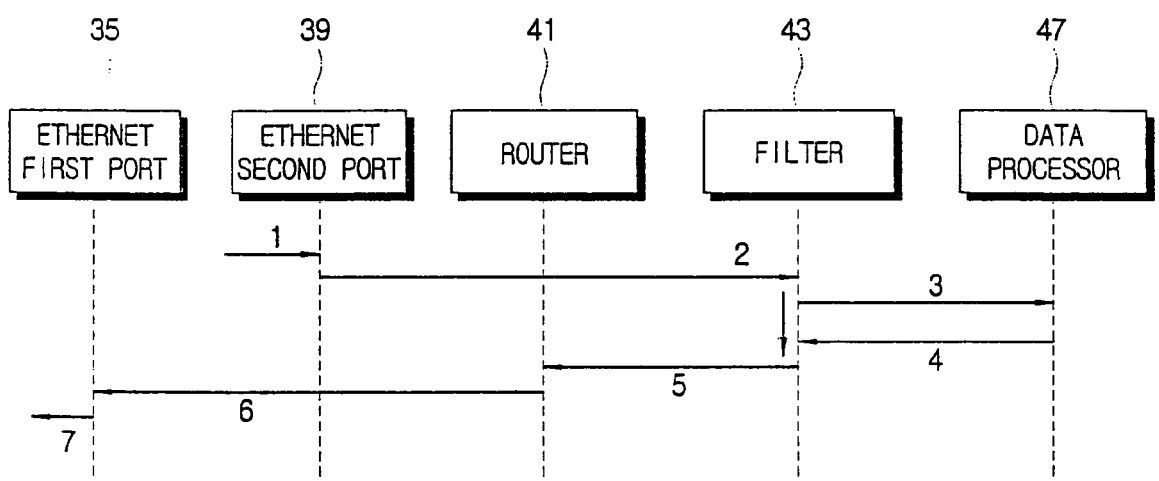
FIG. 5 shows a stream received from the target node and transmitted to the TCP/IP network.

As shown in FIG. 5, a data stream transmitted from the target node 5 through the second port 39 is first transmitted to the data processor 47 through the filter 43, if the data stream is required to be processed in the data processor 47. Then, the data stream is processed by the data processor 47 and transmitted to the first port 35 through the router 41, and then to the network 1 through the first port 35.

If the data stream is not required to be processed in the data processor 47, the data stream is not transmitted to the data processor 47, due to the filter 43, but is transmitted to the first port 35 through the router 41.

Figure 6:
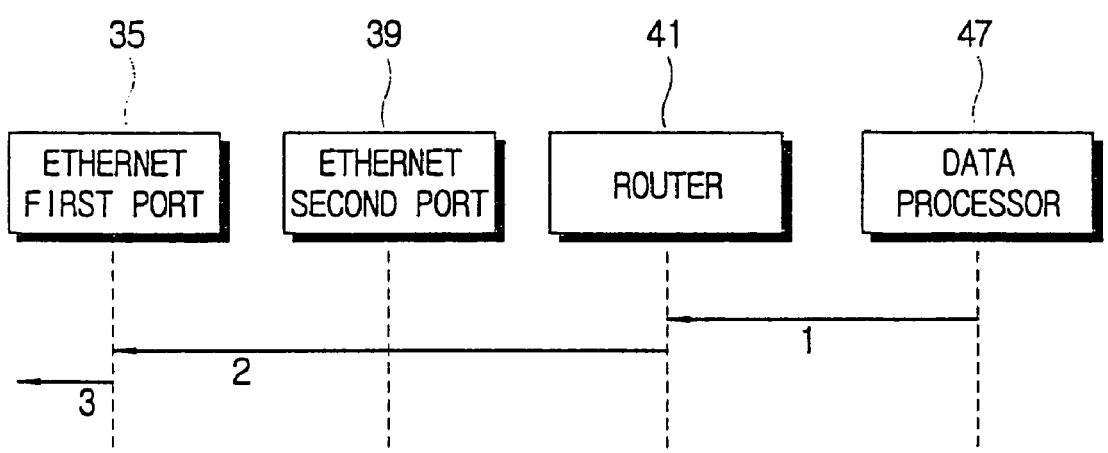
FIG. 6 shows a stream made in the system of FIG. 2 and transmitted to the TCP/IP network.
Figure 7:
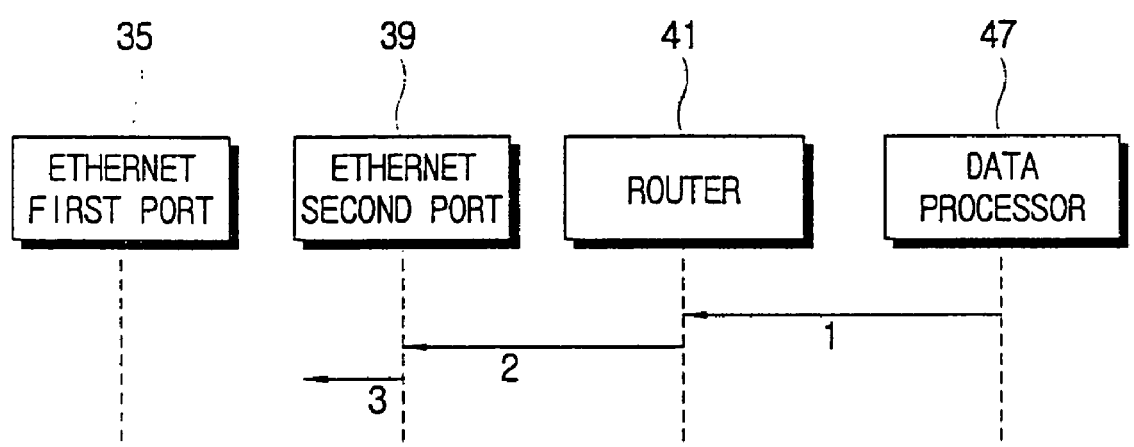
FIG. 7 is a stream made in the system of FIG. 2 and transmitted to the target node.

As shown in FIGS. 6 and 7, if new data is made in the data processor 47 of the gateway 3 according to an embodiment of the present invention, the newly made data is transmitted to the first port 35 through the router 41 and sent to the network 1. Otherwise, the newly made data is transmitted to the second port 39 through the router 41 and sent to the target node 5.

Figure 8:
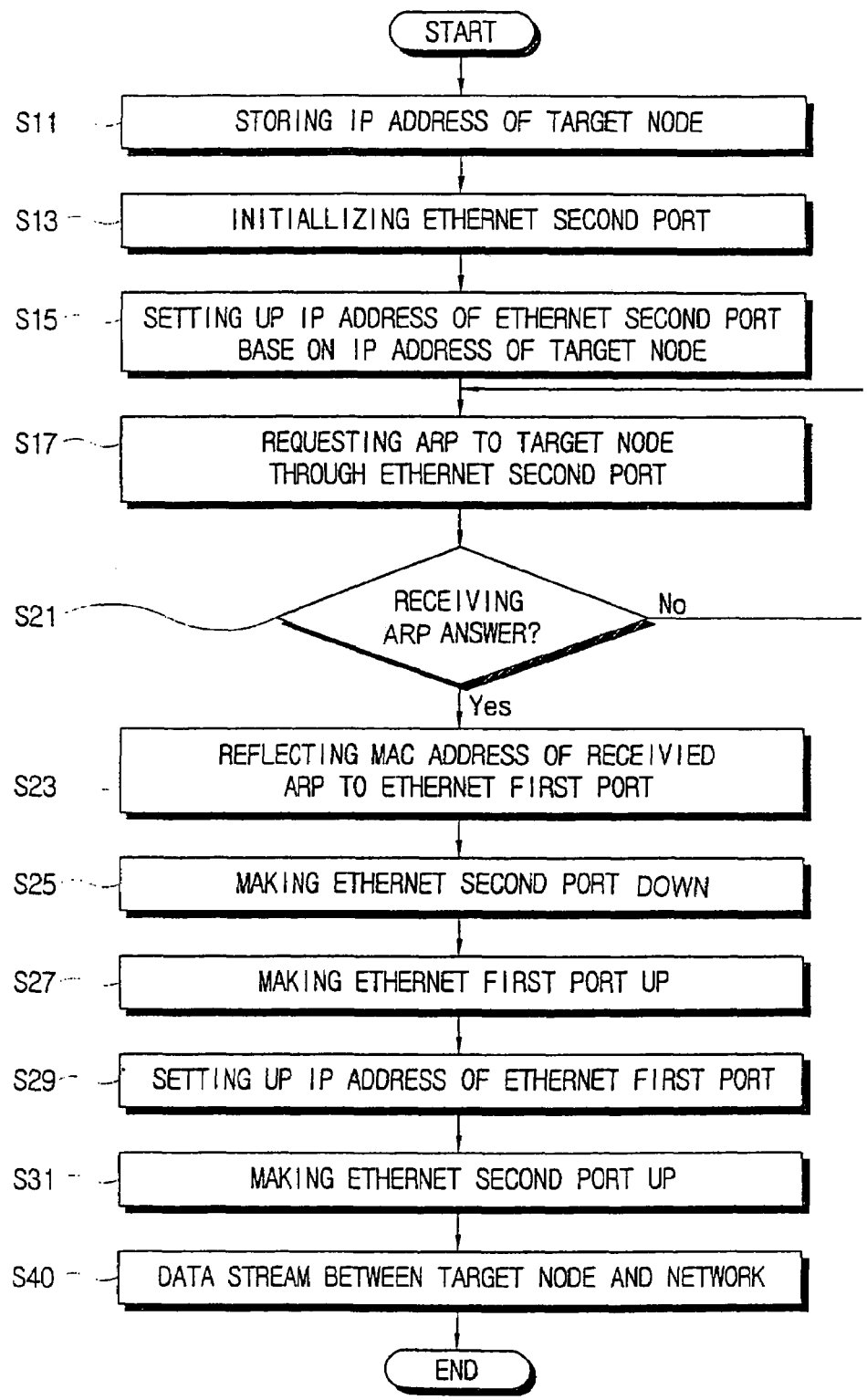
FIG. 8 is a control flow chart of the system of FIG. 2.

Hereinbelow, a control flow of the gateway 3 according to an embodiment of the present invention is described, referring to FIG. 8.

If a user stores an IP address of the target node 5 in the flash memory of the gateway 3 at operation S11 and boots the system, the second port 39 is initialized at operation S13.

The controller 31 reads the IP address of the target node 5 stored in the flash memory and sets up an IP address of the second port 39 at operation S15, based on the IP address of the target node 5. For example, the IP address of the second port 39 may be set up as a number of the IP address of the target node 5 plus 1. Then, the controller 31 requests ARP to the target node 5 through the second port 39 at operation S17 and reads the MAC address of the target node 5, thereby setting up the MAC address of the target node 5 as the MAC address of the first port 35, in the MAC address converter 37, at operation S23.

The controller 31 makes the second port 39 down (deactivates) at operation S25, and then makes the first port 35 up (activates) at operation S27. The controller 31 sets up the IP address of the target node 5 as the IP address of the first port 35 at operation S29, then makes the second port 39 up again at operation S31.

If the controller 31 makes the first port 35 up and sets up the IP address of the target node 5 as the IP address of the first port 35 without making the second port 30 down, the router at first refers to the IP address of the second port 39 when the router 41 sets up a route. Therefore, the controller 31 should make the second port 39 down first, and then make the first port 35 up. Only thereafter, the controller sets up the IP address.

Then, as the IP address of the gateway 3 is in common use of the IP address of the target node 5, an additional IP address needs not to be assigned, thereby saving IP resources. Further, because the IP address of the gateway 3 and the IP address of the target node 5 are the same, an addition or an elimination of the gateway 3 between the network 1 and the target node 5 brings no change of the IP address and the MAC address on the network 1, so that a process to reset an address is not required.

Figure 9:
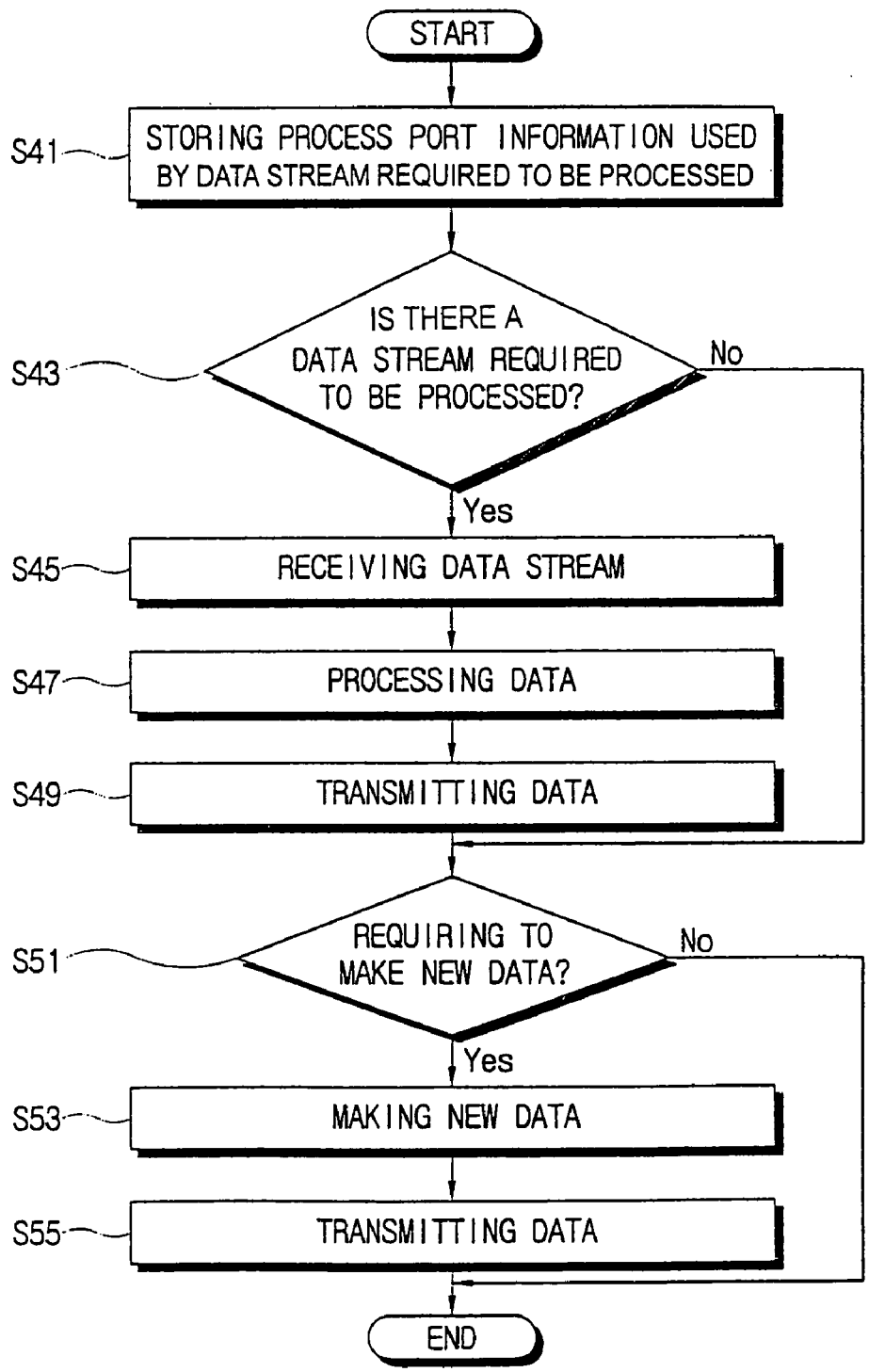
FIG. 9 is a detailed flow chart of the control flow chart of the FIG. 8.

Hereinbelow, it is to described how the gateway 3 processes the data stream between the network 1 and the target node 5, referring to FIG. 9.

Information about process port numbers used by the data stream required to be processed in the data processor 47, at operation S41, is stored in the filter information table 45. If the data stream transmitted from the target node 5 or the network 1 is required to be processed in the data processor 47 at operation S43, the data stream is transmitted to the data processor 47 through the filter 43 at operation S45.

The data processor 47 intercepts and processes the data without touching each setting-up of the specific node of the network 1 and the target node 5, for example, if a third node needs to use the data between the specific node of the network 1 and the target node 5 at operation S47. Otherwise, if the communication between the specific node of the network 1 and the target node 5 is changed into a communication between the specific node of the network 1 and the third node, the communication way of the target node 5 is different from the communication way of the third node, so that the data processor 47 intercepts data transmitted corresponding to the target node 5 and processes the data to correspond to the third node at operation S47. The processed data is transmitted to the network 1 or the target node 5 through the router 41 at operation S49.

Further, if the third node, as a substitute for the specific node, needs to transmit a command to the target node 5 at operation S51, the data processor 47 makes new data and transmits the new data to the target node 5 or the network 1 at operation S55.

As described above, the present invention provides a gateway that is operated by being linked to the IP address of the target address connected to the network, and intercepts and processes a data stream between the network and the target node, thereby transmitting the data stream to the destination, and a control method of the gateway.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A gateway comprising a first port connected to a network and a second port connected to a target node and being employed for a data stream between the network and applications of the target node, the gateway further comprising:
   a storage unit to store an IP address of the target node;
   an MAC address converter to set an MAC address of the target node as an MAC address of the first port;
   a controller to set an IP address of the second port based on an IP address of the target node, and to read the MAC address of the target node through the second port and set the IP address of the target node as an IP address of the first port; and
   a router to set a transmission route and transmit data to the IP address of the target node without a local loop back process, in response to the IP address of the target node and the IP address of the first port being the same.

2. The gateway according to claim 1, further comprising:
   a data processor to intercept the data stream, and then process the data stream or make and transmit a new data stream;
   a filter information table to store information about process port numbers used by the data stream required to be processed in the data processor; and
   a filter transmitting only the data stream required to be processed to the data processor, based on the information stored in the filter information table.

3. The gateway according to claim 1, wherein the MAC address of the target node is read by requesting an ARP to the target node through the second port.

4. The gateway according to claim 1, wherein an address resolution protocol (ARP) is used by the controller to read the MAC address of the target node through the second port.

5. The gateway according to claim 1, wherein the controller deactivates the second port and activates the first port to set the IP address of the target node as the IP address of the first port, and then activates the second port.

6. The gateway according to claim 1, wherein the second port is directly connected to the target node through a local area network (LAN) cable.

7. The gateway according to claim 1, wherein the storage unit comprises a nonvolatile memory.

8. A gateway connected to a network, through a first port, and a target node, through a second port, wherein the gateway is linked to an IP address of the target node, and intercepts and processes a data stream between the network and the target node, and then transmits the data stream to a destination, with the gateway setting a transmission route and transmitting data to the IP address of the target node without a local loop back process, in response to the IP address of the target node and the IP address of the first port of the gateway being the same.

* * * * *